United States Patent
Moss et al.

(10) Patent No.: US 7,010,113 B2
(45) Date of Patent: Mar. 7, 2006

(54) METHOD AND SYSTEM FOR PROVIDING ENHANCED CALLER IDENTIFICATION INFORMATION INCLUDING TOTAL CALL CONTROL FOR ALL RECEIVED CALLS

(75) Inventors: John Wesley Moss, Lake Zurich, IL (US); Thomas Joseph McBlain, Arlington Heights, IL (US); Dianna Inara Tiliks, Elk Grove, IL (US); Nancy Ann Book, Naperville, IL (US); Susanne Marie Crockett, Buffalo Grove, IL (US); Carol Shifrin Gruchala, Naperville, IL (US)

(73) Assignee: SBC Properties, L.P., Reno, NV (US)

( * ) Notice: Subject to any disclaimer, the term of this patent is extended or adjusted under 35 U.S.C. 154(b) by 182 days.

(21) Appl. No.: 10/034,851

(22) Filed: Dec. 27, 2001

(65) Prior Publication Data

US 2003/0123631 A1    Jul. 3, 2003

(51) Int. Cl.
*H04M 3/42* (2006.01)
(52) U.S. Cl. .............................. 379/210.02; 379/201.11
(58) Field of Classification Search .......... 379/210.02, 379/201, 201.07, 201.11, 207.06, 210.03, 379/207.02, 207.03, 142.05, 230, 229, 196
See application file for complete search history.

(56) References Cited

U.S. PATENT DOCUMENTS

| | | | | |
|---|---|---|---|---|
| 5,651,053 A | * | 7/1997 | Mitchell | 379/210.02 |
| 5,729,592 A | * | 3/1998 | Frech et al. | 379/88.19 |
| 5,784,448 A | | 7/1998 | Yaker | |
| 5,850,435 A | | 12/1998 | Devillier | |
| 6,160,876 A | | 12/2000 | Moss et al. | |
| 6,332,021 B1 | | 12/2001 | Latter et al. | |
| 6,459,780 B1 | * | 10/2002 | Wurster et al. | 379/142.02 |
| 6,510,217 B1 | * | 1/2003 | Welch et al. | 379/211.02 |
| 6,574,319 B1 | | 6/2003 | Latter et al. | |
| 6,876,735 B1 | * | 4/2005 | Hill et al. | 379/207.02 |

* cited by examiner

*Primary Examiner*—Fan Tsang
*Assistant Examiner*—Olisa Anwah
(74) *Attorney, Agent, or Firm*—Brinks Hofer Gilson & Lione

(57) ABSTRACT

All calls terminating to a customer's directory number are intercepted. If caller identification information can be presented, the call is forwarded to a service node for disposition. The service node reconfigures signaling information of the call so that the call is not intercepted, then forwards the call to the subscriber's telephone. When the call is answered, the service node states the name or telephone number of the calling party which has been retrieved from the signaling information. The caller can decide whether to take the call, deny the call, send the call to voice mail or send a sales refusal message or other disposition option.

2 Claims, 9 Drawing Sheets

ANNOUNCEMENTS FOR TCP

| | |
|---|---|
| (1.) | YOUR CALL CAN NOT BE COMPLETED. THE NUMBER YOU ARE CALLING IN NOT RECEIVING CALLS AT THIS TIME (SSP ANNC.) |
| (2.) | THE PERSON YOU ARE CALLING IS NOT AVAILABLE. THANK YOU! (CSN ANNC.) |
| (3.) | TOTAL CONTROL. TO CONTINUE PRESS 1. (CSN ANNC.) |
| (4.) | NOW CONNECTING TO AN ANSWERING SYSTEM. <BEEP> (CSN ANNC.) |
| (5.) (5A.) | CALL FROM "INSERT NAME OR NUMBER." NOTE: CSN DOES TEXT TO SPEECH CONVERSION ON DISPLAY TEXT NAME FROM THE ORIGINAL SETUP MESSAGE. IF NAME IS UNKNOWN (CNAME DATABASE ERROR) DO TEXT TO SPEECH CONVERSION ON CALLING DN FROM SETUP MESSAGE. |
| (5B.) | TO ACCEPT THIS CALL, PRESS 1. TO DENY THE CALL, PRESS 2. TO PLAY THE SALES CALL REFUSAL TO THE CALLER, PRESS 3. TO FORWARD THE CALL TO VOICE MAIL, PRESS 4. (CSN ANNC.) |
| (6.) | THE CALL HAS BEEN DENIED. TO ADD THIS NUMBER TO YOUR BLOCKING LIST PRESS 1 NOW, OTHERWISE YOU MAY HANG UP AT ANYTIME. IF YOU ARE ON ANOTHER CALL, PRESS THE RECEIVER BUTTON TO RETURN TO IT NOW. (CSN ANNC.) |
| (7.) | THE NUMBER HAS BEEN ADDED TO YOUR BLOCKING LIST. YOU MAY HANG UP AT ANYTIME, OR, IF YOU ARE ON ANOTHER CALL, PRESS THE RECEIVER BUTTON TO RETURN IT NOW. (CSN ANNC.) |
| (8.) | TO ADD THIS NUMBER TO YOUR BLOCKING LIST PRESS 1 NOW, OTHERWISE YOU MAY HANG UP AT ANYTIME. IF YOU ARE ON ANOTHER CALL, PRESS THE RECEIVER BUTTON TO RETURN TO IT NOW. (CSN ANNC.) |
| (9.) | YOU MAY HANG UP AT ANYTIME. IF YOU ARE ON ANOTHER CALL, PRESS THE RECEIVER BUTTON TO RETURN TO IT NOW. |
| (10.) | ATTENTION! THE PERSON YOU CALLING DOES NOT ACCEPT PHONE SOLICITATIONS. PLEASE ADD THIS PERSON'S NAME AND TELEPHONE NUMBER TO YOUR DO NOT CALL LIST. (CSN ANNC.) |
| (11.) | THE SALES CALL REFUSAL WILL BE PLAYED TO THE CALLER. YOU MAY HANG UP AT ANYTIME, OR, IF YOU ARE ON ANOTHER CALL, PRESS THE RECEIVER BUTTON TO RETURN TO IT NOW. (CSN ANNC.) |
| (12.) | THAT IS NOT A VALID RESPONSE. (CSN ANNC.) |
| (13.) | THE SERVICE CANNOT COMPLETE THE CALL. YOU MAY HANG UP AT ANYTIME, OR, IF YOU ARE ON ANOTHER CALL, PRESS THE RECEIVER BUTTON TO RETURN TO IT NOW. (CSN ANNC.) |
| (14.) | NOW CONNECTING <BEEP>. (CSN ANNC.) |
| (15.) | THE CALL HAS BEEN SENT TO VOICE MAIL. (CSN ANNC.) |
| (16.) | YOUR CALL CANNOT BE COMPLETED AT THIS TIME. PLEASE HANG UP & DIAL THE NUMBER AGAIN. (CSN ANNC.) |

FIG. 9

METHOD AND SYSTEM FOR PROVIDING ENHANCED CALLER IDENTIFICATION INFORMATION INCLUDING TOTAL CALL CONTROL FOR ALL RECEIVED CALLS

BACKGROUND

The present invention relates generally to telecommunications services. More particularly, the present application relates to a method and system for providing enhanced caller identification information including screening invalid calling party numbers.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. This may occur, for example, if the calling party pressed *67 when initiating the call When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcome these deficiencies are needed.

U.S. patent application Ser. No. 09/122,484, filed Jul. 24, 1998 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

U.S. patent application Ser. No. 09/265,001, filed Mar. 3, 1999 and commonly assigned to the assignee of the present application, is incorporated herein by reference. This patent application discloses a method and system for providing to a customer an audible call waiting notification of a current call. The notification is provided for all calls, including a first-received call and a subsequently-received call waiting call. The system notifies the customer that a current call is waiting in a manner that reduces confusion. Confusion is reduced by the combination of audible call waiting indicators and audible caller identification information associated with the calling telephone station. Additionally, both the indicator and the representation of the information can be provided automatically without significant delay. The indication is provided even when standard caller identification information is not available by prompting the caller to provide spoken caller identification information.

In the systems disclosed in the incorporated patent applications, callers to a privacy service subscriber must provide caller identification information before the call is completed. However, additional convenience features are required to enhance the service as a product, to provide additional options for handling every incoming call, and to reliably implement the service in a telecommunication network.

BRIEF DESCRIPTION OF SEVERAL VIEWS OF THE DRAWINGS

FIG. 9 is a table illustrating system messages that may be used in conjunction with the system of FIG. 1 and the method of FIGS. 2–8.

DETAILED DESCRIPTION OF THE PRESENTLY PREFERRED EMBODIMENTS

Figure 1:
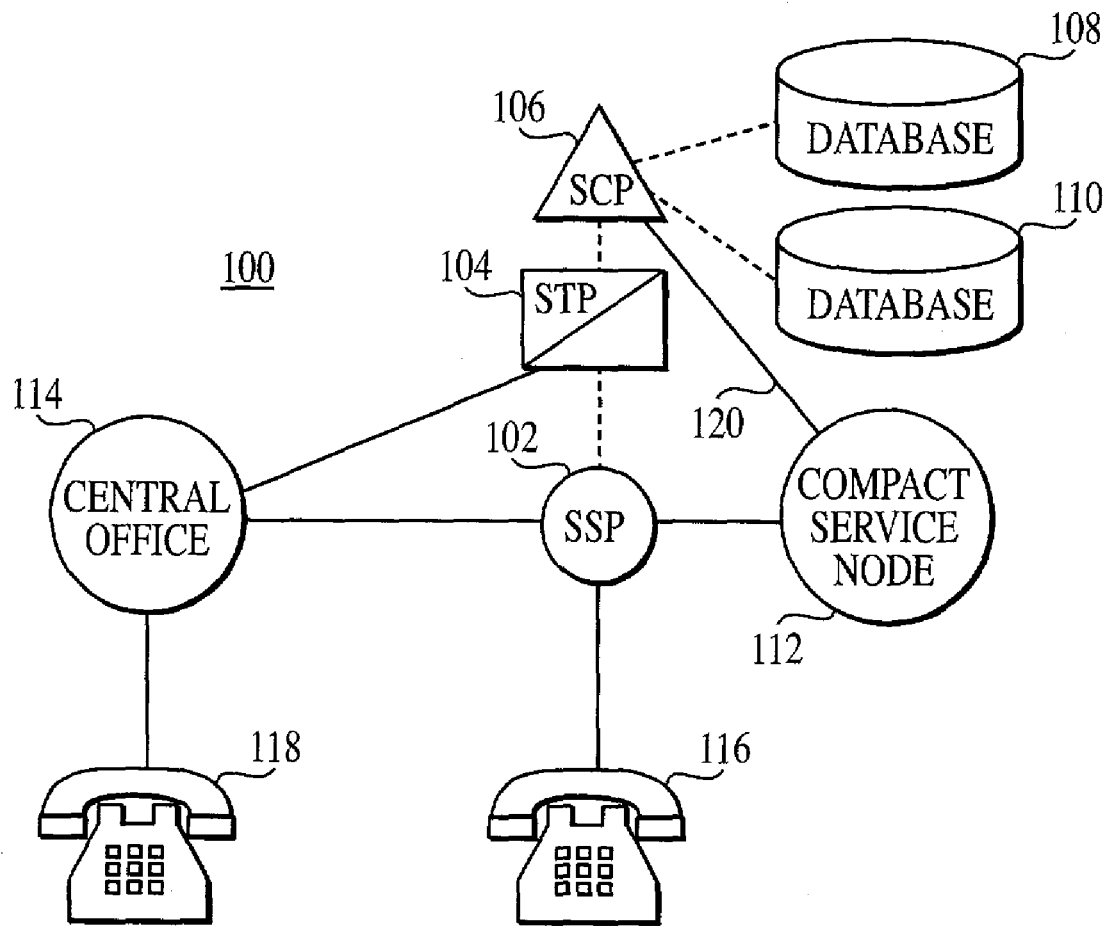
FIG. 1 is a block diagram of a telecommunications system.

By way of introduction only, the preferred embodiments below provide call management features to intercept all calls terminating to a subscriber's directory number. These embodiments are a system and method which may be referred to as Total Control service.

A received call for a Total Control service subscriber is suspended upon receipt. If the call routing information for the calling party is marked presentation restricted or presentation unavailable so that standard caller identification can not be provided, the call is passed to service logic for a separate privacy service. If the call routing information for the calling party is marked presentation allowed, the call will be intercepted by total control service logic and forwarded to network equipment such as a service node or intelligent peripheral (generally, "SN/IP") for disposition. The SN/IP will place a new call to the original called party. When the called party's phone rings and is answered, the called party will hear the name of the calling party and decide whether to accept the call, deny the call, send the call to a sales refusal announcement or send the call to a voice mail box.

The embodiments described herein provide several important benefits. In one embodiment, a call processing system and method allow a subscriber to add incoming calls to a blocking list as desired. Once a directory number is added to the subscriber's blocking list, all subsequent calls from the calling party associated with that directory number will be denied. Blocking is accomplished when the subscriber denies the call and the subscriber is given an option to add the calling directory number to the customer's blocking list. The subscriber does not have to enter the calling party's directory number. In the preferred embodiment, the subscriber only has to enter a single key press, such as pressing 1 on the telephone keypad. In response to detection of this key press, the system will automatically add the calling directory number to the subscriber's blocking list.

In another embodiment, when the SN/IP or other network equipment makes the new call to the subscriber, the call will be uniquely configured to produce the calling party's name or number for display on the subscriber's caller identification unit. Also, in the preferred embodiment, when the subscriber answers the call, the SN/IP will perform a text to speech conversion of the calling party name or number for every call. This information is sent to the SN/IP between the first and second ring on the original call.

To complete the call from the SN/IP to the subscriber and uniquely configure the caller identification information, a new technical implementation is presented. A call setup message for the call from the service node is reconfigured at the SN/IP. Typically, when the SN/IP originates a call, the directory number of the SN/IP is the calling party identifier and the subscriber directory number is the called party identifier. In one embodiment, the parameters of the call setup message are modified to the following:

Setup message:

| | |
|---|---|
| Calling Party ID | DN of original calling party |
| Called Party ID | Total Control subscriber's DN |
| Redirecting Element 1 | a unique 10 digit number assigned to the Total Control service |

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116, calling telephone station 118 and communication link 120. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information. SSP 102 connects called telephone station 116 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 106 and receives and responds to responses to the queries returned from SCP 106. In the illustrated embodiment, communication between the SSP 102 and the SCP 106 employs Transaction Capabilities Applications Protocol or TCAP.

STP 104 preferably comprises a network element that transfers signaling communications in response to signaling protocols such as SS7 or other such signaling protocols as presently known to those skilled in the art or developed in the future. STP 104 preferably transfers queries from SSP 102 to SCP 106 and transfers responses to the queries from SCP 106 to SSP 102.

SCP 106 preferably comprises an AIN element that stores account information, call information and receives and responds to queries. SCP 106 preferably stores account information about a called party's account as well as call control information in the first SCP database 108 and can access the stored information. SCP 106 also stores standard caller identification information in the second SCP database 110 and can access the stored caller identification information. SCP 106 receives queries generated by SSP 102 and preferably responds to the queries by performing database searches to locate the requested call control or account information or caller identification information as known to those skilled in the art. SCP 106 can forward the call control or account information or caller identification information to SSP 102.

CSN 112 preferably comprises a network element that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. The device performing these functions may also be referred to as a SN/IP or service node. These components and others which are operationally equivalent may be substituted for the CSN 112 in FIG. 1 and it is intended that any equipment capable of performing the operations described herein may be used to implement this functionality.

Communication link 120 in the illustrated embodiment provides data communication between the CSN 112 and the SCP 106 according to a predefined data transmission protocol. In the illustrated embodiment, the data transmission protocol is transmission control protocol/internet protocol. In other embodiments, other data transmission protocols or formats may be substituted.

Database 108 preferably comprises a data storage element for use with SCP 106 as known to those skilled in the art. Database 108 preferably stores account and call control information that can be implemented by SSP 102 to control calls. Such account and call control information is known to those skilled in the art.

Database 110 preferably comprises a standard caller identification with name database as known to those skilled in the art. When the information is available in the system, database 110 typically includes the name of the person associated with calling telephone station 118, along with the telephone number that is associated with calling telephone station 118. Database 110 can alternatively comprise a caller assistance database as known to those skilled in the art.

While databases 108, 110 are depicted within a telecommunications system, databases 108, 110 can comprise any suitable databases containing information adapted for use in the present embodiment and are not limited to databases located within a telecommunications network. It is also important to note that while databases 108, 110 re shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise analog telephone sets as known to those skilled in the art. Alternatively, telephone stations 116, 118 can comprise wireless, PCS, ISDN or any other form of communication station known to those skilled in the art. Called telephone station 116 preferably includes customer premises equipment ("CPE") for use with caller identification services as known to those skilled in the art.

FIGS. 2–8 are a flow diagram illustrating one embodiment of a method for processing a call in the telecommunications system of FIG. 1.

Figure 2:
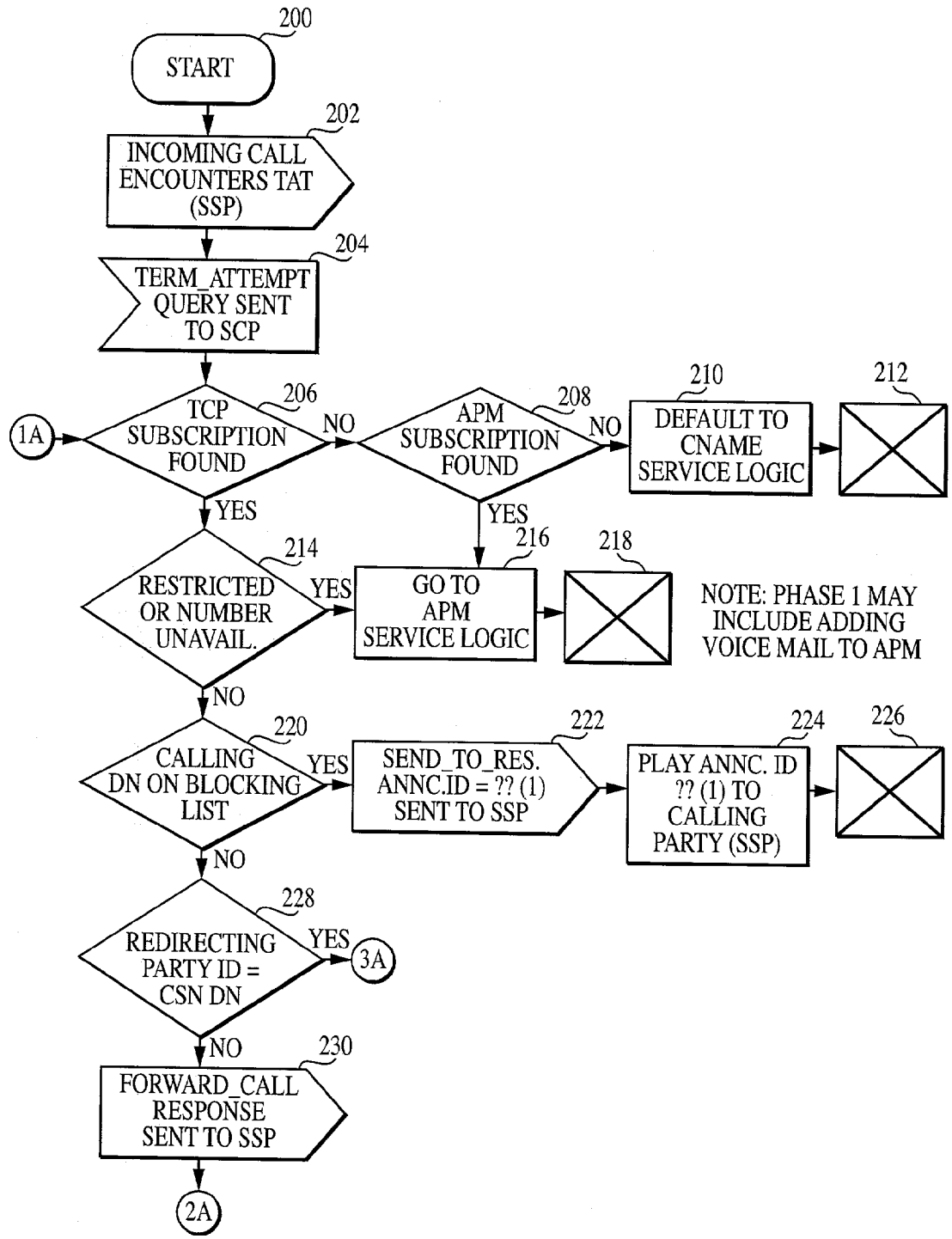
FIGS. 2–8 are a flow diagram illustrating one embodiment of a method for processing a call in the telecommunications system of FIG. 1.

In FIG. 2, the method begins at block 200. At block 202, a call is received in the network. The call is placed by a calling party at a calling communication station and intended for a called party at a called communication station. The call is routed through the network to a terminating SSP associated with the called communication station. At the SSP, the call encounters a termination attempt trigger associated with the Directory Number (DN) of the called communication station. In response to the termination attempt trigger, the SSP transmit a termination attempt query message to the SCP, block 204.

The termination attempt query is processed at the SCP. At block 206, it is determined if the DN of the called party, contained in the termination attempt query message, corresponds to a subscriber to the Total Control service. If not, the SCP determines if the DN for the called party corresponds to a subscriber to a privacy service, block 208. If not, at block 210, the SCP operates to deliver the caller name, if possible, to the called party in accordance with the AIN standard caller name and number delivery feature. At block 212, call processing continues normally.

If, at block 206, it was determined that the called DN corresponds to a Total Control subscriber, at block 214 it is determined if standard caller identification information can be provided for the calling communication station. In some instances, the standard caller identification information cannot be provided. This happens, for example, if the caller has blocked this information or because elements of the telecommunication network do not pass this information.

At the SCP, it is determined if the call is marked presentation restricted or presentation unavailable. This information is contained in a presentation restriction field of network messaging between the SSP and the SCP. If so, control proceeds to block 216 where the SCP implements the service logic for the privacy service. This privacy service may be of the type described in U.S. patent application Ser. No. 09/122,484, filed Jul. 24, 1998, and incorporated herein by reference. At block 218, call processing according to the privacy service continues as normal.

At block 220, after determining that the standard caller identification information can be provided, the SCP determines if the calling directory number (DN) is on a blocking list of the called party. The blocking list corresponds to directory numbers or other identifying information for originating or calling telephone numbers which should be blocked from completing calls to the subscriber. If a DN is on the blocking list, the system automatically prevents all subsequent calls from completing to the called party.

At block 220, the calling directory number is retrieved from the termination attempt query message received by the SCP and compared against the blocking list for the called party. The blocking list may be stored in a database of the SCP or other suitable network location. If the calling directory number is on the subscriber's blocking list, at block 222, the SCP transmits a Send_To_Resource message directing the terminating SSP to transmit an announcement to the calling party announcing the handling of the call.

FIG. 9 is a table listing one embodiment of a set of messages which may be used in conjunction with the method of FIGS. 2–8 and the system of FIG. 1. At block 222 (FIG. 2), the Send_To_Resource message transmitted to the SSP includes an announcement identifier which identifies the announcement the SSP is 224 to play to the calling party. At block 224, the SSP plays the specified announcement to the calling party. In one embodiment, announcement (1) from FIG. 9 is played, explaining to the calling party that the call cannot be completed and that the called number is not receiving calls at this time. At block 226, call processing continues as normal.

If, at block 220, the calling directory number was not on the subscriber's blocking list, at block 228 it is determined if the Redirecting Party ID of the termination attempt query message received by the SCP is set equal to the directory number of the network equipment identified to handle the playing of announcements and collections of digits for the Total Control service. The Redirecting Party ID is one of the data fields of an SS7 message communicated among components of the network. The identified network equipment maybe an AIN service node, a Compact Service Node (CSN), an Intelligent Peripheral or SN/IP or other functionally equivalent combination of hardware and software. If the directory number assigned to this equipment is contained in the Redirecting Party identifier field of the termination attempt query message, control proceeds to block 402, FIG. 4. Otherwise, at block 230 the SCP transmits a Forward_Call response message to the SSP. Control then proceeds to block 302 FIG. 3.

Figure 3:
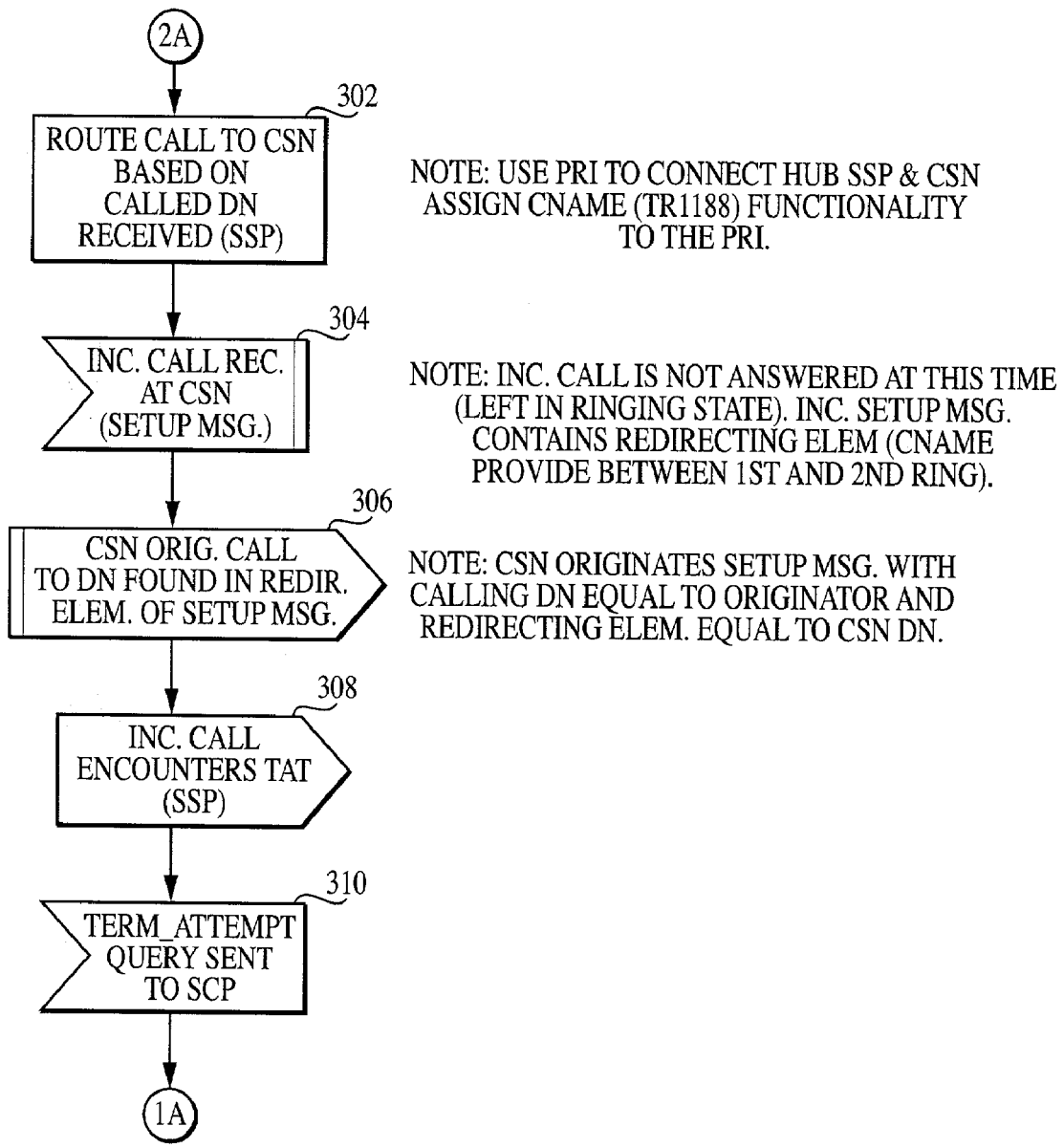

FIG. 3 illustrates a new technical implementation for completing a call from a SSP or SN/IP to the subscriber and configuring caller identification information. At block 302, the call information is routed from the terminating SSP to the CSN, based on the called directory number received in the Forward_Call response message from the SCP. In one embodiment, a primary rate interface (PRI) is used to connect the SSP and the CSN. CNAME (TR1188) functionality is assigned to the PRI. At block 304, the call is received at the CSN and the setup message prepared by the SSP is interpreted. The incoming call is not answered at this time, but rather is left in a ringing state. That is, the calling party hears ringing. The incoming setup message received from the SSP contains redirecting element information. The caller name is provided between the first and the second ring and received at the CSN.

At block 306, the CSN originates a new call to the directory number found in the redirecting element of the call setup message received from the SSP. The CSN originates a setup message with the Calling Party ID set equal to the original calling party and the Redirecting Element set equal to the directory number for the CSN. Thus, the setup message includes the following information.

| Calling Party ID | DN of original calling party |
|---|---|
| Called Party ID | Total Control Subscriber DN |
| Redirecting Element 1 | a unique 10 digit number assigned to the Total Control service |

Reconfiguring the redirecting element in this manner will allow the SCP service logic to determine that the call is from the CSN and should be presented to the subscriber, rather than forwarded back to the CSN. If this parameter is missing, the call from the CSN would go into an indefinite loop and no calls would complete to the customer.

At block 308, the call including the setup message formatted by the CSN is received at the SSP. The incoming call encounters a termination attempt trigger at the SSP. In response to the termination attempt trigger, the SSP transmits a terminating attempt query message at block 310 to the SCP for processing. Control then proceeds to block 206, FIG. 2.

On this pass through the logic illustrated in FIG. 2, the only change is the information tested at block 228. In this case, the redirecting party identifier has been set equal to the directory number for the CSN. Thus, control proceeds to block 402, FIG. 4.

Figure 4:
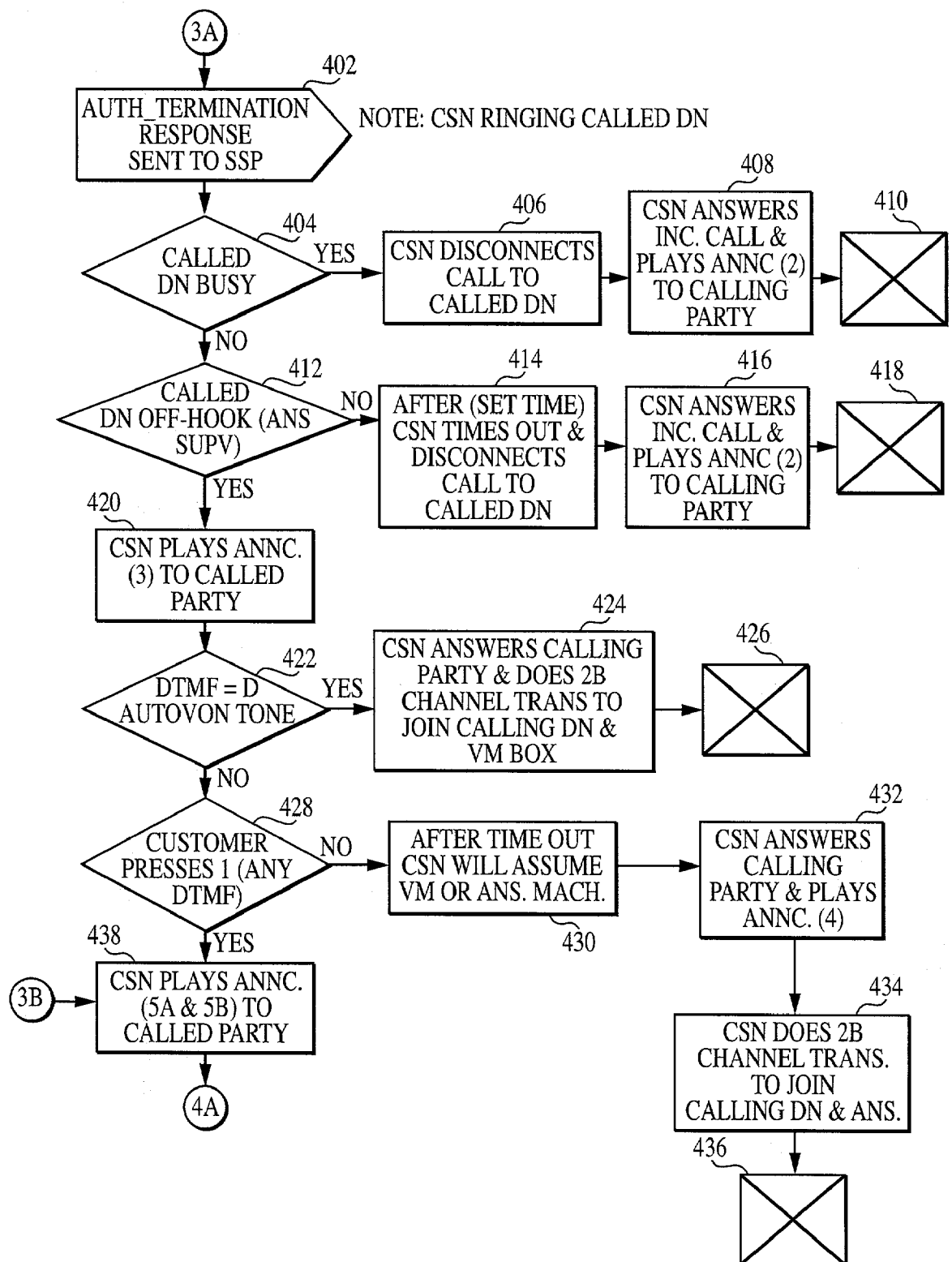

FIG. 4 illustrates actions taken by the SSP and CSN in attempting to complete the call to the called party at the called communication station. At block 402, the SSP receives an Authorize_Termination response message from the SCP. This message contains the information necessary to complete routing of the call to the called directory number. Upon receipt of this message, the SSP directs the CSN to begin ringing the called directory number.

At block 404, it is determined if the called directory number is busy. If so, at block 406, the CSN disconnects the call to the called directory number and at block 408 the CSN answers the incoming call and plays a suitable announcement to the calling party. One example of a suitable announcement is announcement (2) in FIG. 9, communicating that the called party is not available. Call processing continues normally at block 410.

At block 412, it is determined if the called telephone is off hook, indicating that the called party is answering the phone. If not, at block 414, after a predetermined time, the CSN times out and disconnects the call from the called telephone. At block 416, the CSN answers the incoming call and plays a suitable announcement to the calling party. Again, an example of a suitable announcement is announcement (2), FIG. 9. Call processing continues normally at block 418.

At block 420, if it was determined at block 412 that the called directory number is off hook and being answered, the CSN plays a suitable announcement to the called party. An example of a suitable announcement is announcement (3), FIG. 9. This announcement identifies the total control service and asks the called party to respond, acknowledging the announcement. At block 422, the CSN determines if the response from the called party is a DTMF D-tone, i.e., autovon tone or other type of actuation by the called party at the called communication station. If so, at block 424, the CSN answers the call from the calling party and does a 2B channel transfer to join the call from the calling party to the voice mail box associated with the called party. Call processing then continues normally at block 426.

At block 428, the CSN determines if the subscriber presses any key of the telephone keypad. If not, at block 430, the CSN waits for a timeout period. After this period has elapsed, the CSN will assume that the call has been answered at the called communication station by an answering machine or other answering device. At block 432, the CSN then answers the calling party and plays a suitable announcement, such as announcement (4) of FIG. 9. At block 434, the CSN does a 2B channel transfer to join the call from the calling directory number and the answering system. Call processing then continues normally at block 436.

If, at block 428, the specified customer response was received, at block 438, the CSN plays a suitable announcement to the called party. In the embodiment of FIG. 4, the specified response is a pressing of the number 1 on the telephone keypad by the customer. If the CSN detects this, for example by sampling the DTMF received from the called communication station, the CSN then plays an announcement identifying the calling party. Any DTMF entry will be detected.

In accordance with one embodiment, the CSN receive the display text name for the calling party between the first and second ring of the original call. The CSN does a text-to-speech conversion on this received text to complete the announcement of the calling party identification. If the name was unknown, corresponding to a CNAME database error, the CSN will retrieve the calling directory number from the setup message. This number is transmitted in the Calling Party ID parameter of the AIN messaging. The CSN will then do a text-to-speech conversion on the calling directory number. Thus, preferably the display text name information is used to announce the name of the calling party. If unavailable, the calling DN from the setup message is used to announce the telephone number of the calling party.

As shown in message (5B) of FIG. 9, the called party is further given options for call disposition. In the illustrated embodiment, pressing 1 on the telephone keypad will accept the call, pressing 2 will deny or reject the call, pressing 3 will play a sales call refusal message to the caller and pressing 4 will forward the call to voicemail. This announcement is played to the called party by the CSN. Control then proceeds to block 502, FIG. 5.

Figure 5:
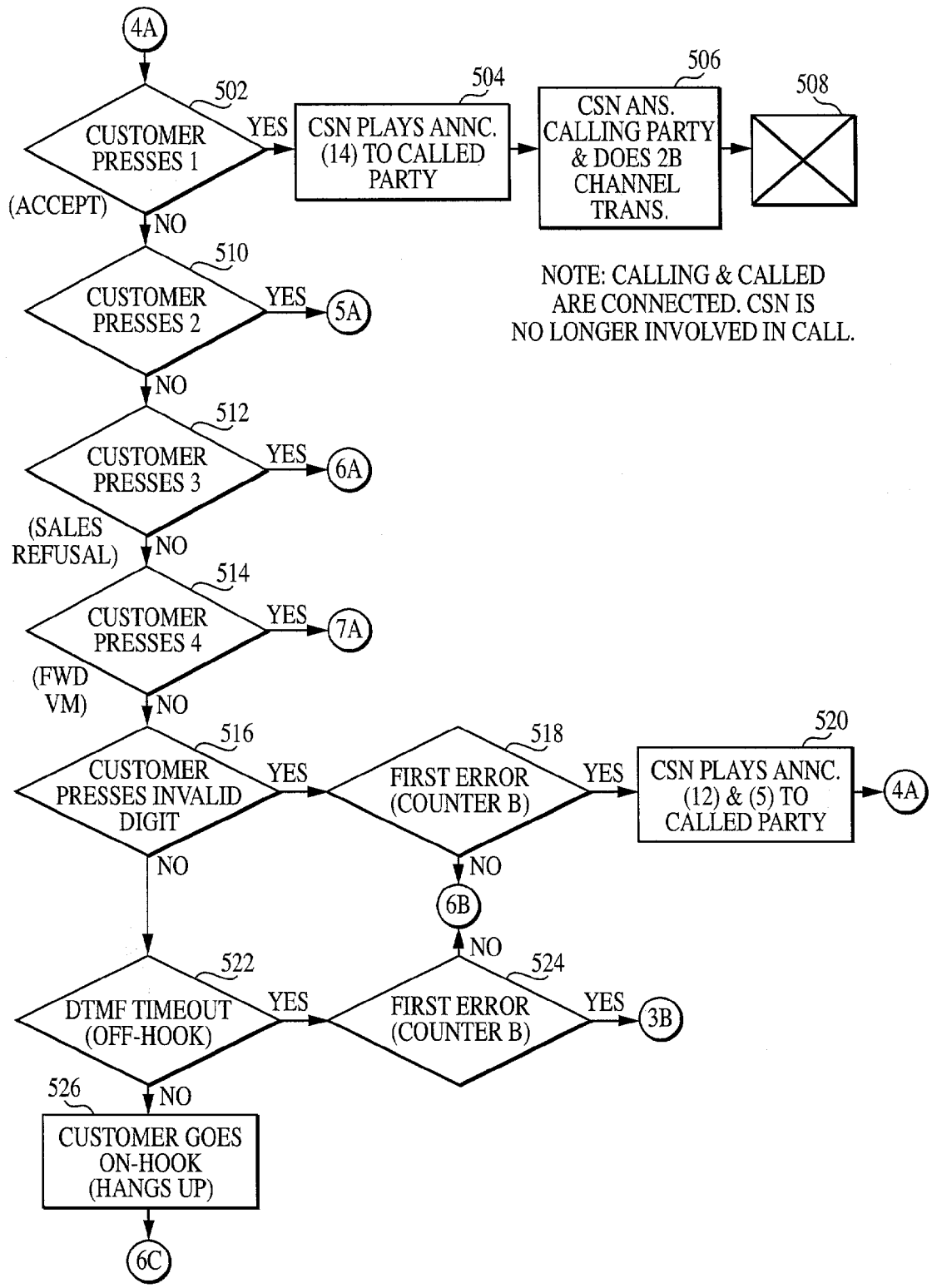

FIG. 5 illustrates processing of selected call disposition options from a subscriber to the Total Control service. At block 502, the CSN determines if the subscriber has pressed the number 1 on the keypad, corresponding to accepting the call. If so, at block 504, the CSN plays a suitable announcement to the called party. For example, in message (14) of FIG. 9, the CSN announces that it is now connecting the call to the calling party. At block 506, the CSN answers the call from the calling party and does a 2B channel transfer, connecting the calling party and the called party. At this point, the CSN is no longer involved in the call and the calling and called parties are directly connected through the network. Call processing continues at block 508.

At block 510, it is determined if the subscriber pressed number 2 on the keypad, corresponding to a rejection of the call. If so, call processing continues at block 602, FIG. 6.

At block 512, it is determined if the customer has pressed number 3 on the telephone keypad. This corresponds to sending the sales refusal message to the caller. If so, call processing continues at block 702, FIG. 7.

At block 514, it is determined if the customer has pressed the number 4 on the telephone keypad. This corresponds to a forward to voicemail. If so, call processing continues at block 802, FIG. 8.

At block 516, it is determined if the customer has pressed an invalid digit, corresponding to an option not provided for call disposition. If so, at block 518, it is determined if this is the first error committed by the called party. For example, a counter may be implemented tracking the number of erroneous responses from the called party. If this is not the first error, control proceeds to block 708, FIG. 7. If this is the first error, the CSN plays suitable announcements to the called party, block 520. Examples of suitable announcements are announcements 12 and 5, FIG. 9, explaining that the received response is not valid and inviting the subscriber to enter a valid response. Control then returns to block 502.

If, at block 516, the customer did not press an invalid digit, at block 522 it is determined if a timeout condition has occurred. This will occur if no response is received from the customer within a predetermined time, such as 5 seconds. If the timeout occurs, at block 524 it is determined if this is the first customer error encountered. If so, control proceeds to block 708, FIG. 7. Otherwise, control proceeds to block 436, FIG. 4, where an announcement is again played to the called party, prompting the called party to respond.

If the timeout condition tested at block 522 does not occur, at block 526, the system determines that the called party has gone back on hook or hung up the phone. Control then proceeds to block 714, FIG. 7.

Figure 6:
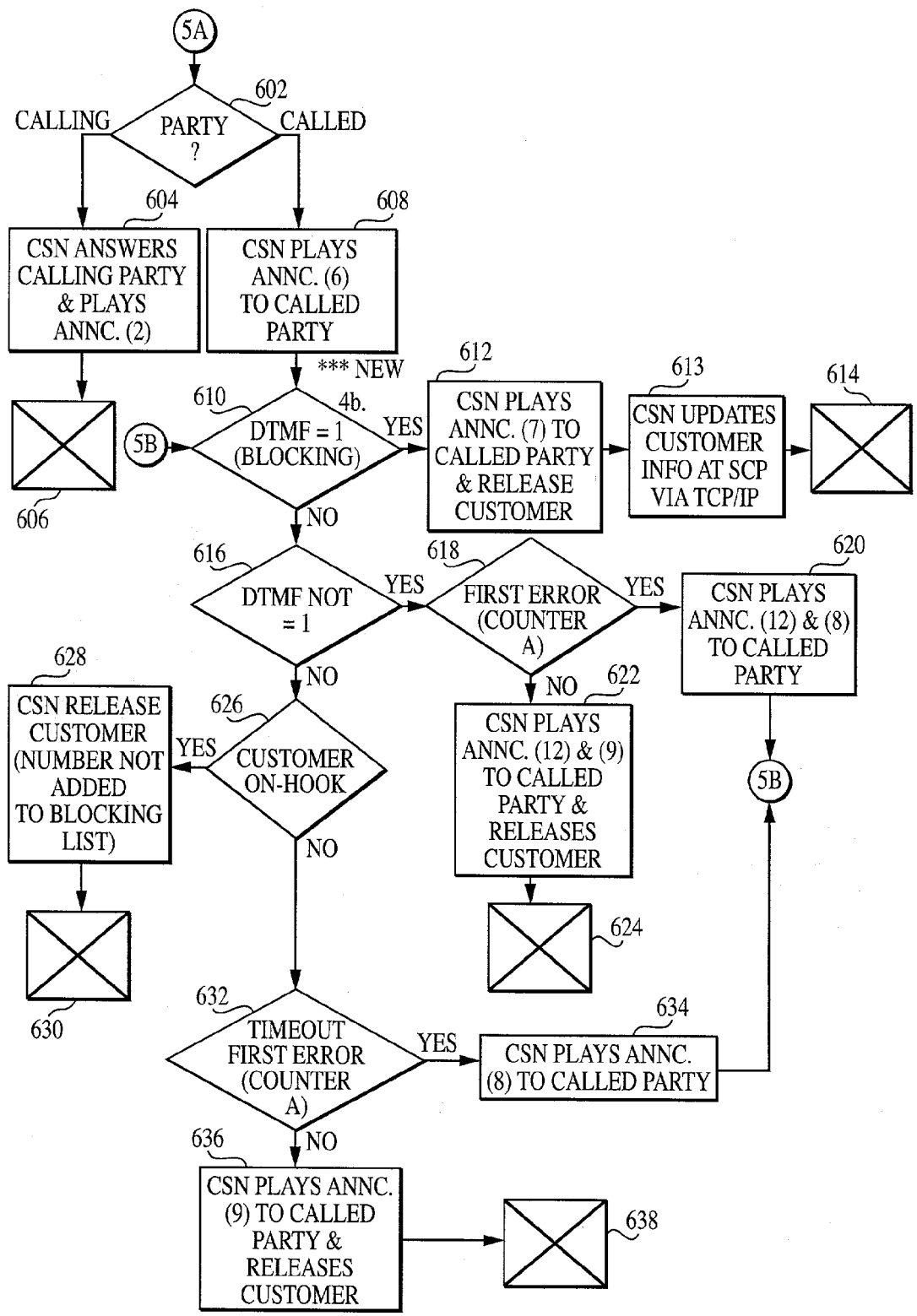

FIG. 6 illustrates actions to be taken upon receipt of a rejection of the call by the called party and an offer of the option to add the directory number of the calling party to the subscriber's blocking list. At block 602, the CSN identifies the party to which an announcement should be communicated. For the calling party, at block 604, the CSN answers the call from the calling party and plays a suitable announcement to the calling party. One example of a suitable announcement is announcement (2), FIG. 9, stating that the called party is not currently available. Call processing continues normally at block 606.

At block 608, for the called party, the CSN plays an announcement regarding the called party's denial of the incoming call. An example of a suitable announcement is announcement (6), FIG. 9. In accordance with the current embodiment, the announcement invites the called party to add the directory number associated with the calling party to the called party's blocking list. A call disposition option, such as pressing 1 to add the number to the blocking list, is provided. At block 610, if the digit collected by the CSN is a 1 or other specified digit for adding the calling party identifier to the blocking list, at block 612, the CSN plays a suitable announcement to the called party and releases the call with the called party. One example of a suitable announcement is announcement (7), FIG. 9, which confirms the addition of the calling directory number to the called party's blocking list At block 613, the CSN updates the customer blocking list at the SCP via a TCP/IP link between the CSN and SCP. Other data communication formats or channels may be used. Call processing continues at block 614.

If the CSN did not detect entry of the option selecting addition of the directory number to the blocking list, at block 616, the CSN determines if the customer entered a selection other than 1 or other valid selection. If so, at block 618, the CSN determines if this is the first erroneous entry by the subscriber, for example by testing a counter. In the case of the first error, at block 620, the CSN plays appropriate announcements inviting the called party to enter a valid selection. Control returns to block 610 to test the entry provided by the customer. If this was not the first erroneous entry by the subscriber at block 618, the CSN plays a suitable announcement to the called party and releases the call at block 622. Examples of suitable announcements are announcements (12) and (9), FIG. 9, explaining the response is not valid and inviting the customer to hang up. Call processing continues normally at block 624.

If neither a valid nor an invalid entry was received from the subscriber at blocks 610, 616, block 626 determines if the subscriber's telephone has gone back on hook. If so, at block 628, the CSN releases the call to the subscriber and the number is not added to the blocking list. Call processing continues as normal in block 630. If the customer has not gone on hook, at block 632 the CSN tests for a timeout condition. Further, the CSN determines if this was the first error in processing the call to subscriber. This may be done, for example, by testing a counter. If this is the first error, at block 634, the CSN plays a suitable announcement to the called party. One example of a suitable announcement is announcement (8), FIG. 9, which again invites the subscriber to add the calling directory number to the subscriber's blocking list. Control then proceeds to block 610 to detect a subsequent entry by the subscriber.

If, at block 632, this was not the first error, or if any other error criteria has been met, at block 636, the CSN plays an announcement to the called party and releases the call to the subscriber. One example of a suitable announcement is announcement (9), FIG. 9, inviting the subscriber to hang up at any time. Call processing proceeds as normal at block 638.

Figure 7:
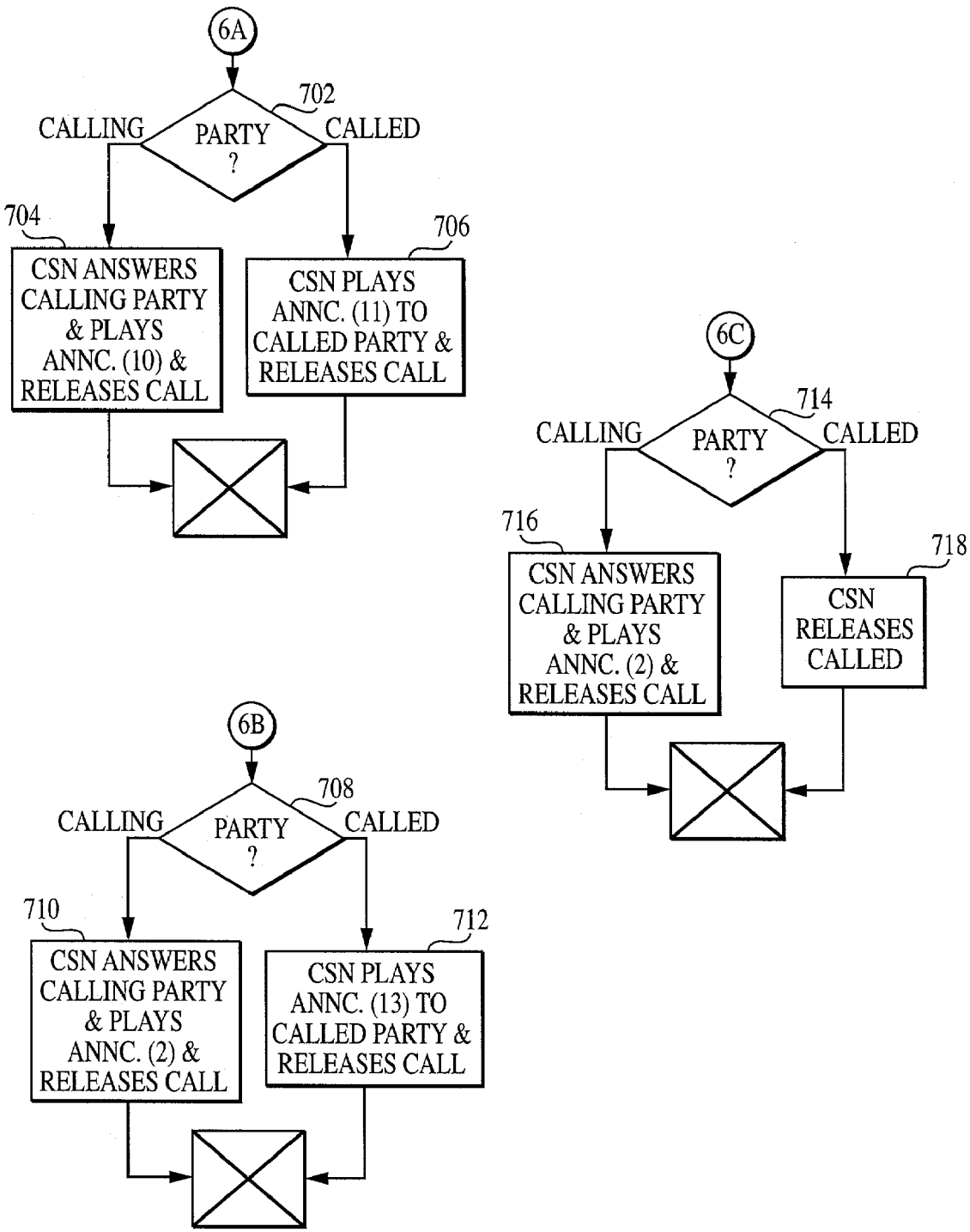

FIG. 7 illustrates processing of several call distribution options extended to the Total Call service subscriber during processing of the call in FIG. 5. At block 702, the processing of a sales refusal message is begun. First it is determined to which party a message should be played. For the calling party, block 704, the CSN answers the call from the calling party and plays a suitable announcement to the calling party, then releases the call. One example of a suitable announcement is announcement (10), FIG. 9, refusing the solicitation from the calling party. For the called party, block 706, the CSN plays a suitable announcement to the called party and then releases the call. One example of a suitable announcement is announcement (11), FIG. 9, confirming the playing of the sales call refusal message to the caller and inviting the called party to hang up at any time.

At block 708, processing of the call when successive erroneous or invalid entries have been received from the called party is begun. At block 710, a suitable message is played to the calling party. One example of a suitable message is message (2), FIG. 9, simply stating that the called party is not available. After the CSN plays this announcement, the call is released by the CSN. At block 712, for the called party, the CSN plays a suitable announcement, such as announcement (13), FIG. 9, stating that the service cannot complete the call and inviting the called party to hang up. The CSN then releases the call to the called party.

At block 714, processing for the situation where the customer has gone back on hook, hanging up on the call, is begun. For the calling party, at block 716, the CSN plays a suitable announcement, such as announcement (2), FIG. 9, stating that the called party is not available. The CSN then releases the call from the calling party. At block 718, since the called party has already hung up, the CSN simply releases the call.

Figure 8:
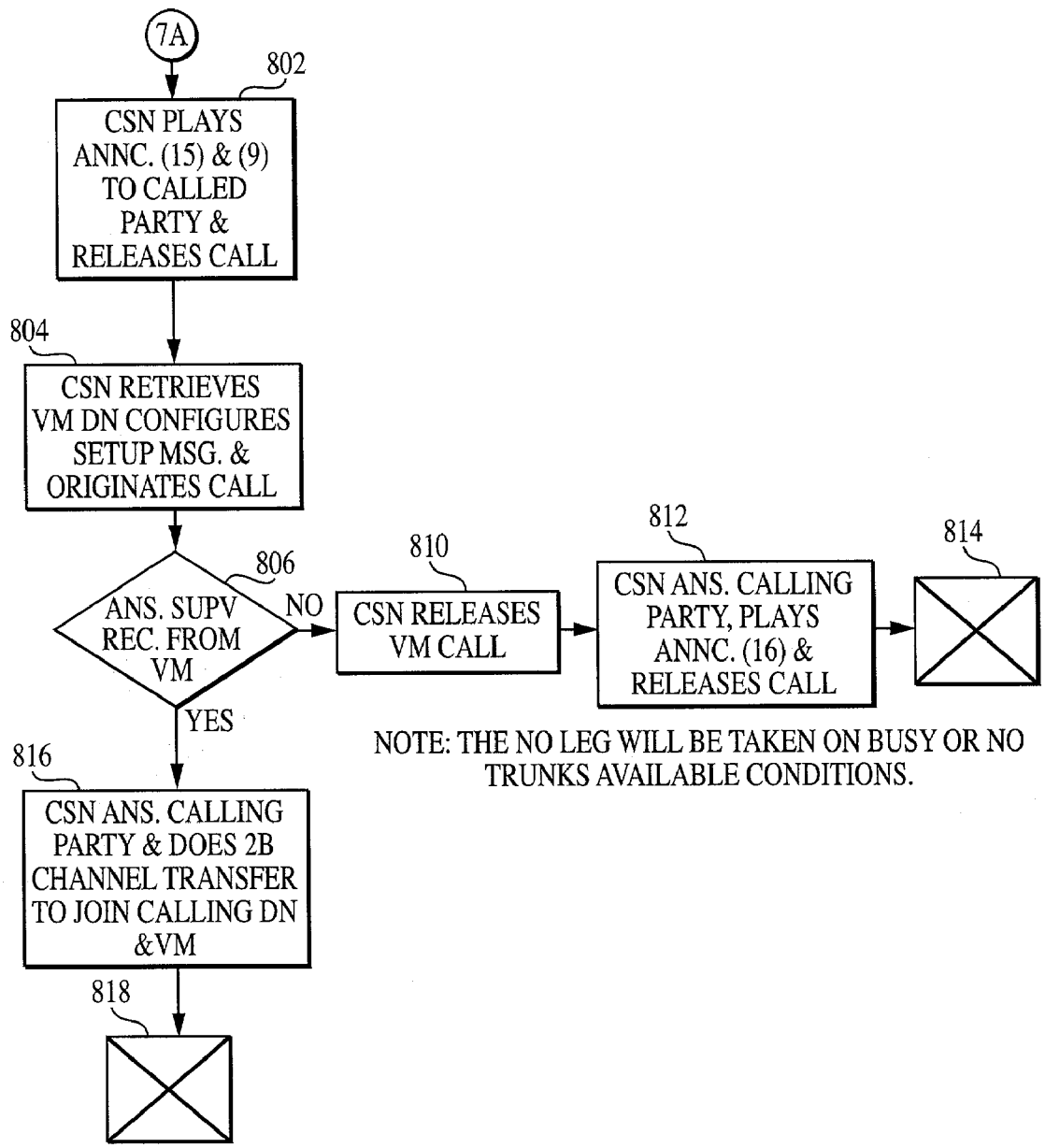

FIG. 8 illustrates operation of the CSN when the subscriber has selected routing the call to a voicemail system as the call disposition option, block 514, FIG. 5. At block 802, the CSN plays appropriate announcements to the called party and releases the call. Examples of appropriate announcements are announcements (15) and (9), FIG. 9. These announcements, for example, confirm the called party's selection routing the call to voicemail and advise the called party that they may hang up. At block 804, the CSN retrieves the directory number assigned to the called party's voicemail. The CSN configures the setup message to route the call to the voicemail directory number. The CSN then originates the call, transferring the call to the voicemail directory number. At block 806, the CSN determines if the recording from the voicemail is available. If not, at block 810, the CSN releases the call placed to the voicemail directory number. At block 812, the CSN answers the call from the calling party, makes an appropriate announcement and releases the call. An appropriate announcement is exemplified by announcement (16), FIG. 9, explaining that the calling party's call cannot be completed and requesting hang up and redial. Call processing continues normally at block 814.

If the CSN detects operation of the voicemail system, at block 816, the CSN answers the call from the calling party and does a 2B channel transfer to join the calling directory number and the voicemail directory number. At block 818, call processing continues as normal.

As can be seen from the foregoing, the present embodiments provide a system and method for intercepting all calls terminating to a customer's directory number. If caller identification information can not be provided based on the signaling information for the call, the call is passed to a privacy service for processing. If caller identification information can be presented and the customer is a subscriber to the Total Control service, the call is forwarded to a CSN, SN/IP or service node for disposition. The service node places a call to the subscriber's telephone. When the call is answered, the service node states the name or telephone number of the calling party which has been retrieved from the signaling information. The caller can decide whether to take the call, deny the call, send the call to voice mail or send a sales refusal message or other disposition option.

By routing the call to the CSN or service node, the signaling traffic required for playing messages and collecting digit information from the subscriber is removed from the SCP and SSP, freeing them up to handle other call messaging. The CSN is well-suited to interaction with a customer by playing messages and collecting digits. By appropriately reconfiguring elements of the AIN messages, the source of the new call may be identified so that the call can be completed to the subscriber when the call is placed by equipment of the Total Control service.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for implementing a call control service when processing a call in a telecommunications system, the call being from a calling party at a calling communication station having a calling party directory number, the call intended for a called party at a called communication station at a called party directory number, the method comprising:

routing the call to a terminating service switching point (SSP) associated with the called communication station;

transmitting a termination attempt query from the terminating SSP to a service control point (SCP);

at the SCP, in response to the termination attempt query, determining if the called party associated with the called party directory number is a subscriber to the call control service;

if so, determining if a redirecting element field is set to a specified directory number of network equipment designated to process calls for the call control service;

if the redirecting element field is set to the specified directory number, sending a forward call response message to the terminating SSP;

in response to the forward call response message, routing the call from the terminating SSP to the network equipment designated to process calls for the call control service using a directory number of the called party directory number field of the forward call message;

at the network equipment, originating a new call to the called party directory number, including formatting a setup message with a redirecting element field set to the specified directory number of the network equipment designated to process calls for the call control service;

receiving the new call at the terminating SSP;

in response to the received new call, transmitting a new terminating attempt query from the terminating SSP to the SCP;

at the SCP, determining if the redirecting element field is set to the specified directory number;

if so, sending an authorize termination message from the SCP to the terminating SSP for processing of the call to the called communication station.

2. The method of claim 1 further comprising:

in response to the authorize termination message, ringing the called communication station from the network equipment;

providing call disposition options to the called communication station;

detecting a selected call disposition option entered at the called communication station;

if the detected call disposition option corresponds to a rejection of the call, playing a message to the called communication station inviting the addition of the calling party directory number to a blocking list associated with the called party directory number;

detecting a response from the called communication station; and if the response is affirmative, communicating information about addition of the calling party directory number to the blocking list from the network equipment to the SCP to update the blocking list stored at the SCP.

* * * * *